(12) United States Patent
Oshima

(10) Patent No.: US 11,769,431 B2
(45) Date of Patent: *Sep. 26, 2023

(54) PROJECTION DISPLAY DEVICE, DISPLAY CONTROL METHOD, AND DISPLAY CONTROL PROGRAM

(71) Applicant: FUJIFILM Corporation, Tokyo (JP)

(72) Inventor: Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 17/551,191

(22) Filed: Dec. 15, 2021

(65) Prior Publication Data

US 2022/0108642 A1 Apr. 7, 2022

Related U.S. Application Data

(63) Continuation of application No. 16/351,518, filed on Mar. 13, 2019, now Pat. No. 11,250,748, which is a
(Continued)

(30) Foreign Application Priority Data

Sep. 16, 2016 (JP) ................................. 2016-181516

(51) Int. Cl.
*B60K 35/00* (2006.01)
*G09G 3/02* (2006.01)
(Continued)

(52) U.S. Cl.
CPC ............. *G09G 3/025* (2013.01); *B60K 35/00* (2013.01); *G02B 27/01* (2013.01);
(Continued)

(58) Field of Classification Search
CPC ............... G09G 3/025; G09G 2320/08; G09G 2380/10; B60K 35/00; G02B 27/0101;
(Continued)

(56) References Cited

U.S. PATENT DOCUMENTS

2010/0066832 A1* 3/2010 Nagahara ............... G02B 27/01
348/148
2010/0253593 A1 10/2010 Seder et al.
(Continued)

FOREIGN PATENT DOCUMENTS

CN 101872069 10/2010

OTHER PUBLICATIONS

Office Action of China Counterpart Application, with English translation thereof, dated Jan. 25, 2022, pp. 1-8.
(Continued)

*Primary Examiner* — Temesghen Ghebretinsae
*Assistant Examiner* — Sosina Abebe
(74) *Attorney, Agent, or Firm* — JCIPRNET

(57) ABSTRACT

A projection display device includes an image display control unit configured to perform a first display control for generating image data in accordance with information received from a control unit that controls the vehicle, and a second display control for generating image data in accordance with the measurement information acquired from the information measuring device without passing through the control unit, and a warning determination unit, wherein the image display control unit performs the second display control when the warning determination unit determines that the warning is necessary, and performs the first display control when the warning determination unit determines that the warning is not necessary, in a first mode in which driving of the vehicle is performed in accordance with an internally generated instruction or an instruction externally and wirelessly received, the image display control unit performs at least the second display control without passing through the control unit.

13 Claims, 6 Drawing Sheets

Related U.S. Application Data continuation of application No. PCT/JP2017/017171, filed on May 1, 2017.

(51) Int. Cl.
*G08G 1/16* (2006.01)
*G09G 5/00* (2006.01)
*G02B 27/01* (2006.01)

(52) U.S. Cl.
CPC ........... *G02B 27/0101* (2013.01); *G08G 1/16* (2013.01); *G09G 5/00* (2013.01); *B60K 2370/334* (2019.05); *B60K 2370/52* (2019.05); *G02B 2027/0114* (2013.01); *G02B 2027/0141* (2013.01); *G09G 2320/08* (2013.01); *G09G 2354/00* (2013.01); *G09G 2380/10* (2013.01)

(58) Field of Classification Search
CPC .......... G02B 2027/0141; G02B 27/149; G02B 27/0093; G02B 2027/0167; G06F 3/147; G08G 1/163

See application file for complete search history.

(56) References Cited

U.S. PATENT DOCUMENTS

| | | | | |
|---|---|---|---|---|
| 2012/0050139 A1* | 3/2012 | Wang | ................. | G02B 27/0101 345/7 |
| 2016/0052394 A1* | 2/2016 | Yamada | ............... | G01C 21/365 701/93 |
| 2016/0073031 A1* | 3/2016 | Watanabe | .......... | G02B 27/0149 345/7 |
| 2016/0161833 A1* | 6/2016 | Watanabe | ................. | B60R 1/00 345/7 |
| 2016/0170487 A1* | 6/2016 | Saisho | ................... | B60K 35/00 345/156 |
| 2016/0365068 A1* | 12/2016 | Sakaguchi | ............. | B60K 35/00 |
| 2017/0101092 A1* | 4/2017 | Nguyen Van | ............. | G01S 7/40 |
| 2017/0106750 A1* | 4/2017 | Tauchi | ...................... | B60R 1/00 |
| 2017/0269364 A1* | 9/2017 | Fujita | ..................... | H04N 23/00 |
| 2018/0012489 A1* | 1/2018 | Nonoyama | .......... | G08G 1/0967 |
| 2019/0205662 A1* | 7/2019 | Samal | ................... | G03B 17/02 |

OTHER PUBLICATIONS

Office Action of China Counterpart Application, with English translation thereof, dated Sep. 8, 2021, pp. 1-22.

\* cited by examiner

corrupted input skipped …

PROJECTION DISPLAY DEVICE, DISPLAY CONTROL METHOD, AND DISPLAY CONTROL PROGRAM

CROSS REFERENCE TO RELATED APPLICATION

This application is a continuation of U.S. application Ser. No. 16/351,518 filed on Mar. 13, 2019, which is a continuation of International Application No. PCT/JP2017/017171 filed on May 1, 2017, which claims priority from Japanese Patent Application No. 2016-181516 filed on Sep. 16, 2016. The entirety of each of the above-mentioned patent applications is hereby incorporated by reference herein and made a part of this specification.

BACKGROUND OF THE INVENTION

1. Field of the Invention

The present invention relates to a projection display device, a display control method, and a computer readable medium storing a display control program.

2. Description of the Related Art

A head-up display (HUD) for a vehicle has been known. In the HUD, a combiner that is disposed on a windshield of a vehicle, such as an automobile, a train, a ship, a heavy machine, an aircraft, or an agricultural machine, or that is disposed near a position before the windshield is used as a screen, and light is projected onto the screen to display an image. The HUD enables a driver to visually recognize an image that is based on light projected from the HUD as a real image on the screen or as a virtual image in front of the screen.

Systems for assisting driving by using the HUD are described in JP2015-197706A, JP2015-225615A, JP2016-112987A, JP2013-535376A, and JP2006-058064A.

JP2015-197706A and JP2015-225615A describe an HUD that controls a displayed image in accordance with information from a control unit of an automobile.

JP2016-112987A, JP2013-535376A, and JP2006-058064A describe an HUD that acquires information of various types of sensors mounted in an automobile and controls a displayed image in accordance with the information.

SUMMARY OF THE INVENTION

In recent years, automated driving of vehicles has been developed toward practical use, but there is an issue that automated driving or the like increases a burden on a control unit of an automobile. That is, when the HUD controls a displayed image in accordance with information from the control unit of the automobile, as in JP2015-197706A and JP2015-225615A, a delay in display is likely to occur when the control unit of the automobile is highly loaded.

As in JP2016-112987A, JP2013-535376A, and JP2006-058064A, when the HUD constantly performs a process of information from various types of sensors and generation of image data based on this process, the HUD is highly loaded, and an increase in temperature inside the HUD and a delay in display are likely to occur. For example, when a delay occurs in displaying warning information for notifying a driver of a situation where danger is approaching, a delay is likely to occur in an action for avoiding the danger.

The present invention has been made in view of the above-described circumstances, and an object of the present invention is to provide a projection display device, a display control method, and a display control program that are capable of assisting safe driving while preventing a delay in displaying important information.

A projection display device of the present invention includes: a light modulation unit that spatially modulates, in accordance with image data that has been input, light emitted by a light source; a projection optical system that projects the light that has been spatially modulated onto a projection surface of a vehicle; a measurement information acquisition unit that acquires measurement information measured by an information measuring device; an image display control unit that performs either first display control for generating image data in accordance with information received from a control unit that controls the vehicle and for inputting the image data to the light modulation unit or second display control for generating image data in accordance with the measurement information and for inputting the image data to the light modulation unit; and a warning determination unit that determines, in accordance with the measurement information, whether or not a warning is necessary, wherein the image display control unit performs the second display control when the warning determination unit determines that the warning is necessary, and performs the first display control when the warning determination unit determines that the warning is not necessary.

A display control method for a projection display device of the present invention is a display control method for a projection display device having a light modulation unit that spatially modulates, in accordance with image data that has been input, light emitted by a light source, and a projection optical system that projects the light that has been spatially modulated onto a projection surface of a vehicle, the display control method including: a measurement information acquisition step of acquiring measurement information measured by an information measuring device mounted in the vehicle; an image display control step of performing either first display control for generating image data in accordance with information received from a control unit that controls the vehicle and for inputting the image data to the light modulation unit or second display control for generating image data in accordance with the measurement information and for inputting the image data to the light modulation unit; and a warning determination step of determining, in accordance with the measurement information, whether or not a warning is necessary, wherein the image display control step performs the second display control when the warning determination step determines that the warning is necessary, and performs the first display control when the warning determination step determines that the warning is not necessary.

A display control program for a projection display device of the present invention is a display control program for a projection display device having a light modulation unit that spatially modulates, in accordance with image data that has been input, light emitted by a light source, and a projection optical system that projects the light that has been spatially modulated onto a projection surface of a vehicle, the display control program causing a computer to execute: a measurement information acquisition step of acquiring measurement information measured by an information measuring device mounted in the vehicle; an image display control step of performing either first display control for generating image data in accordance with information received from a control unit that controls the vehicle and for inputting the image data to the light modulation unit or second display control for generating image data in accordance with the measurement information and for inputting the image data to the light modulation unit; and a warning determination step of determining, in accordance with the measurement information, whether or not a warning is necessary, wherein the image display control step performs the second display control when the warning determination step determines that the warning is necessary, and performs the first display control when the warning determination step determines that the warning is not necessary.

According to the present invention, it is possible to provide a projection display device, a display control method, and a display control program that are capable of assisting safe driving while preventing a delay in displaying important information.

DESCRIPTION OF THE PREFERRED EMBODIMENTS

Hereinafter, an embodiment of the present invention will be described with reference to the drawings.

Figure 1:
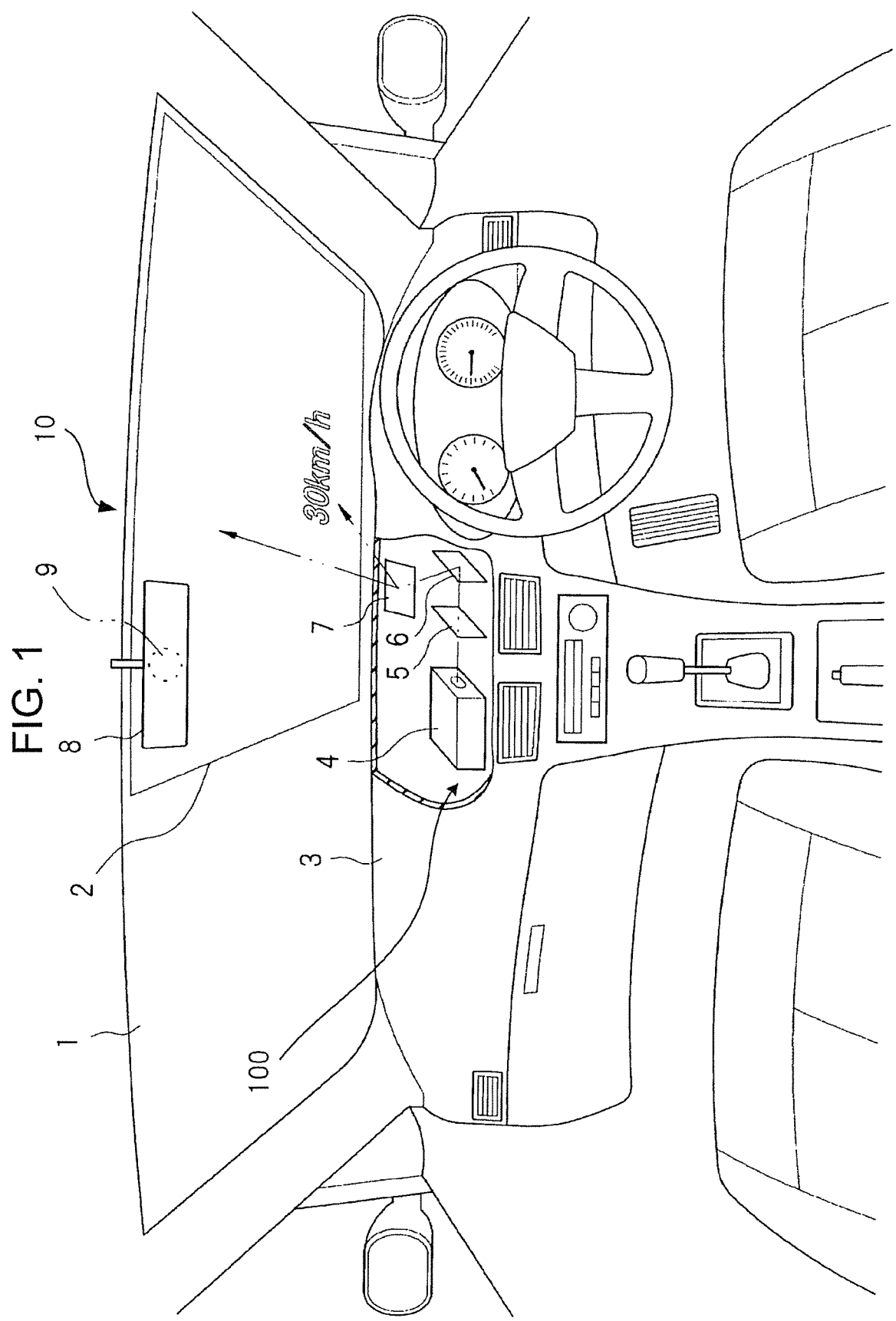
FIG. 1 is a schematic diagram illustrating an indoor configuration of an automobile 10 in which an HUD 100, which is an embodiment of a projection display device of the present invention, is mounted.

FIG. 1 is a schematic diagram illustrating an indoor configuration of an automobile 10 in which a head-up display (HUD) 100, which is an embodiment of a projection display device of the present invention, is mounted.

A part of a front windshield 1 of the automobile 10 is a region that has been processed to reflect image light, which will be described below, and this region constitutes a projection surface 2.

An imaging device 9 attached to a rearview mirror 8 is used to capture an image of the inside of the automobile 10 and is connected to a system control unit 60 (described below) of the HUD 100 in a wired or wireless manner. A captured image signal acquired through image capturing by the imaging device 9 is transferred to the system control unit 60 of the HUD 100 by wired communication or wireless communication.

The HUD 100 is mounted in the automobile 10 and enables a driver of the automobile 10 to visually recognize a virtual image or real image by using image light projected onto the projection surface 2, which is a region of a part of the front windshield 1 of the automobile 10.

The HUD 100 may be used by being mounted in a vehicle, such as a train, a heavy machine, a construction machine, an aircraft, a ship, or an agricultural machine, as well as an automobile.

In the example illustrated in FIG. 1, the HUD 100 is built in a dashboard 3 of the automobile 10. The dashboard 3 is a member that contains, in its inside, built-in components including gauges for presenting information necessary for driving, such as a speedometer, a tachometer, a fuel gauge, a water temperature gauge, an odometer, or the like of the automobile 10.

The HUD 100 includes a control unit 4, a diffusion member 5, a reflection mirror 6, and a concave mirror 7. The control unit 4 includes a light source and a light modulation element that spatially modulates, in accordance with image data, light emitted by the light source. The diffusion member 5, the reflection mirror 6, and the concave mirror 7 constitute a projection optical system that projects, onto the projection surface 2 of the front windshield 1, image light that has been spatially modulated by the light modulation element of the control unit 4.

The diffusion member 5 is a member that diffuses the image light that has been spatially modulated by the light modulation element of the control unit 4, thereby making a plane light source. As the diffusion member 5, a micromirror array having a fine structure on its surface, a diffusion mirror, a reflection holographic diffuser, or the like is used.

The reflection mirror 6 reflects the image light diffused by the diffusion member 5.

The concave mirror 7 enlarges and reflects the image light reflected by the reflection mirror 6 and projects the image light onto the projection surface 2. The projection surface 2 of the front windshield 1 has been processed to reflect the image light projected from the concave mirror 7 in the direction of the eyes of the driver.

Alternatively, the HUD 100 may be disposed near the ceiling of the automobile 10, for example, and may have a configuration of projecting image light onto a combiner of a sun visor type installed near the ceiling of the automobile 10. In this configuration, the combiner constitutes a projection surface.

The driver of the automobile 10 is able to visually recognize information, such as an icon or characters, for assisting driving, by looking at a virtual image that is based on the image light projected onto and reflected by the projection surface 2. In addition, the projection surface 2 has a function of allowing light from the outside (outside world) of the front windshield 1 to pass therethrough. Thus, the driver is able to visually recognize an image in which a virtual image that is based on the image light projected from the concave mirror 7 and an outside view are superimposed on one another.

Figure 2:
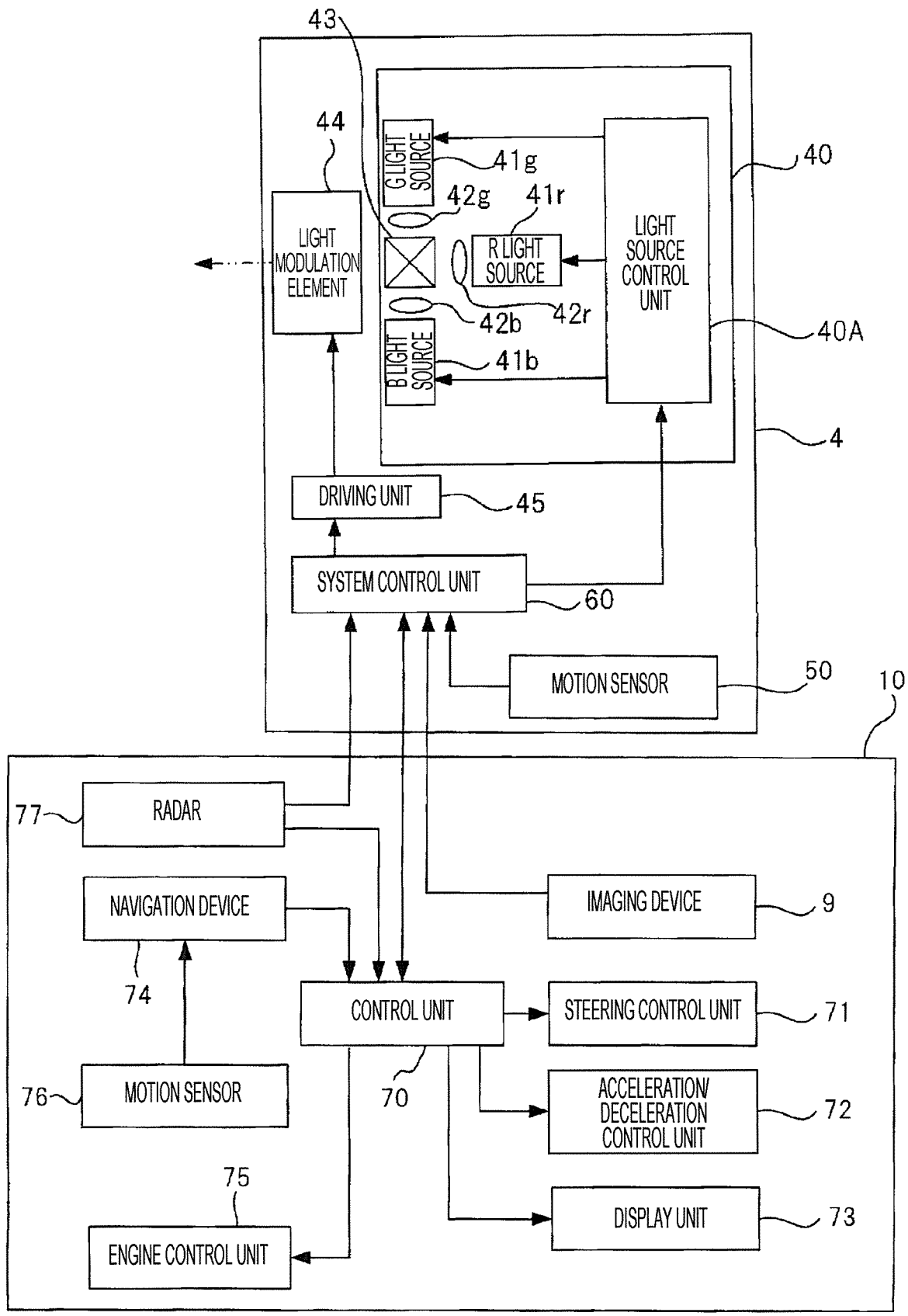
FIG. 2 is a schematic diagram illustrating internal hardware configurations of a control unit 4 of the HUD 100 and the automobile 10 illustrated in FIG. 1.

FIG. 2 is a schematic diagram illustrating internal hardware configurations of the control unit 4 of the HUD 100 and the automobile 10 illustrated in FIG. 1.

The control unit 4 includes a light source unit 40, a light modulation element 44, a driving unit 45 that drives the light modulation element 44, a motion sensor 50, and a system control unit 60 that centrally controls the entire HUD 100.

The system control unit 60 includes one or more of various types of processors, a read only memory (ROM) storing a program or the like executed by the processors, and a random access memory (RAM) functioning as a work memory of the processors.

The various types of processors include a central processing unit (CPU), which is a general-purpose processor that executes a program to perform various types of processes; a programmable logic device (PLD), which is a processor capable of changing the circuit configuration after manufacturing, such as a field programmable gate array (FPGA); or a dedicated electric circuit or the like, which is a processor having a circuit configuration designed specifically to execute a specific process, such as an application specific integrated circuit (ASIC).

The structure of these various types of processors is, more specifically, an electric circuit in which circuit elements such as semiconductor elements are combined.

The system control unit 60 may be constituted by one of the various types of processors or may be constituted by a combination of two or more processors of the same type or different types (for example, a combination of a plurality of FPGAs or a combination of a CPU and an FPGA).

The light source unit 40 includes a light source control unit 40A, an R light source 41r serving as a red light source that emits red light, a G light source 41g serving as a green light source that emits green light, a B light source 41b serving as a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43. The R light source 41r, the G light source 41g, and the B light source 41b constitute a light source of the HUD 100.

The dichroic prism 43 is an optical member for guiding rays of light emitted by the R light source 41r, the G light source 41g, and the B light source 41b to an identical light path. The dichroic prism 43 allows red light collimated by the collimator lens 42r to pass therethrough and emits the red light to the light modulation element 44. In addition, the dichroic prism 43 allows green light collimated by the collimator lens 42g to be reflected thereby and emits the green light to the light modulation element 44. Furthermore, the dichroic prism 43 allows blue light collimated by the collimator lens 42b to be reflected thereby and emits the blue light to the light modulation element 44. The optical member having such a function is not limited to the dichroic prism. For example, a cross dichroic mirror may be used.

A light emitting element, such as a laser or a light emitting diode (LED), is used as each of the R light source 41r, the G light source 41g, and the B light source 41b. The light source of the HUD 100 is not limited to the three light sources, that is, the R light source 41r, the G light source 41g, and the B light source 41b, and may be constituted by one light source, two light sources, or four or more light sources.

The light source control unit 40A controls each of the R light source 41r, the G light source 41g, and the B light source 41b, and performs control to cause light to be emitted by each of the R light source 41r, the G light source 41g, and the B light source 41b.

The light modulation element 44 spatially modulates, in accordance with image data received from the system control unit 60, the rays of light emitted by the R light source 41r, the G light source 41g, and the B light source 41b and emitted from the dichroic prism 43.

As the light modulation element 44, for example, liquid crystal on silicon (LCOS), a digital micromirror device (DMD), a micro electro mechanical systems (MEMS) element, a liquid crystal display element, or the like may be used.

The driving unit 45 drives the light modulation element 44 in accordance with image data received from the system control unit 60 and causes image light that has been spatially modulated in accordance with the image data (red image light, blue image light, and green image light) to be emitted from the light modulation element 44 to the diffusion member 5. The light modulation element 44 and the driving unit 45 constitute a light modulation unit of the HUD 100.

The projection optical system constituted by the diffusion member 5, the reflection mirror 6, and the concave mirror 7 illustrated in FIG. 1 is optically designed so that an image that is based on image light projected onto the projection surface 2 can be visually recognized by the driver as a virtual image at a position in front of the front windshield 1. The projection optical system may be optically designed so that the image that is based on the image light can be visually recognized by the driver as a real image on the front windshield 1.

The motion sensor 50 is an information measuring device that measures information about a motion of the HUD 100 relative to a ground surface. The motion sensor 50 is constituted by, for example, one or both of an acceleration sensor that measures an acceleration generated in the HUD 100 and an angular rate sensor that measures an angular rate generated in the HUD 100.

Measurement information measured by the motion sensor 50 is input to the system control unit 60. Hereinafter, a description will be given under the assumption that the motion sensor 50 includes an acceleration sensor and an angular rate sensor.

The system control unit 60 controls the light source control unit 40A and the driving unit 45 to cause image light that is based on image data to be emitted from the control unit 4 to the diffusion member 5, in accordance with an instruction from a control unit 70 of the automobile 10.

The automobile 10 includes the control unit 70 that centrally controls the entire automobile 10, a steering control unit 71 that controls a steering, an acceleration/deceleration control unit 72 that controls acceleration/deceleration of the automobile 10 by controlling a brake and an accelerator, a display unit 73, a navigation device 74, an engine control unit 75 that controls an engine of the automobile 10 in response to an instruction from the control unit 70, a motion sensor 76, a radar 77, and the imaging device 9.

The control unit 70 includes one or more of the above-described various types of processors, a ROM storing a program or the like executed by the processors, and a RAM functioning as a work memory of the processors.

The automobile 10 is settable to a first mode (automated driving mode) in which driving is performed in accordance with an instruction internally generated by the control unit 70 or an instruction externally and wirelessly received by the control unit 70, and a second mode (manual driving mode) in which a person drives manually.

When the first mode is set, the processor of the control unit 70 inputs an internally generated instruction or an externally and wirelessly received instruction to the steering control unit 71 and the acceleration/deceleration control unit 72.

In accordance with the instruction from the control unit 70, the steering control unit 71 controls the steering to control the direction in which the automobile 10 drives.

In accordance with the instruction from the control unit 70, the acceleration/deceleration control unit 72 controls the brake and the accelerator to control the running speed of the automobile 10.

When the second mode is set, the control unit 70 does not generate the above-described instruction and does not control the steering control unit 71 and the acceleration/deceleration control unit 72. Thus, in the first mode, the processing load on the control unit 70 is relatively high.

The motion sensor 76 is an information measuring device for measuring a motion of the automobile 10 relative to the ground surface, and is constituted by, for example, one or both of an acceleration sensor and an angular rate sensor. The measurement information measured by the motion sensor 76 is input to the navigation device 74.

The radar 77 is an information measuring device for recognizing an obstacle or measuring a distance to the obstacle, and is, for example, a laser radar, an ultrasonic radar, a millimeter-wave radar, or the like.

Although not illustrated, the automobile 10 includes, mounted therein, another information measuring device for measuring a state of the automobile 10 or surroundings of the automobile 10.

Another information measuring device mounted in the automobile 10 may be an illuminance sensor for detecting ambient illuminance, a gauge (a tachometer, a speedometer, a cooling water temperature gauge, a fuel gauge, or the like), a Global Positioning System (GPS) receiver for measuring position information, or the like.

The display unit 73 is a liquid crystal display device or the like built in, for example, a center console between a driver's seat and a passenger seat, and displays various pieces of information in accordance with an instruction from the control unit 70.

The navigation device 74 generates route guidance information for performing route guidance to a destination, in accordance with measurement information measured by the motion sensor 76, position information measured by the GPS receiver, running speed information measured by the speedometer of the automobile 10, and the like, and inputs the generated route guidance information to the control unit 70.

The imaging device 9 captures an image of a subject by using an optical system and an imaging element, and inputs a captured image signal acquired through the image capturing to the system control unit 60 of the HUD 100. The imaging device 9 captures, for example, an image of a range including the face of a person seated on the driver's seat of the automobile 10.

The imaging device 9 captures an image of the driver to acquire information indicating a state of the driver, and is one of information measuring devices.

The measurement information measured by a device, other than the imaging device 9 and the motion sensor 76, among the information measuring devices mounted in the automobile 10, is input to the control unit 70. The measurement information measured by the speedometer, the radar 77, and the imaging device 9 among the information measuring devices mounted in the automobile 10 is also input to the system control unit 60 of the HUD 100.

The measurement information measured by the speedometer, the radar 77, and the imaging device 9 is preferably input to the system control unit 60 without passing through the control unit 70.

The ROM of the control unit 70 stores, in advance, display items that can be displayed by the HUD 100.

The control unit 70 acquires the measurement information measured by the information measuring devices mounted in the automobile 10, the route guidance information generated by the navigation device 74, and the like. In accordance with these pieces of information, the control unit 70 decides necessary information among the foregoing display items as display target information that is to be displayed by the HUD 100, and inputs the display target information to the system control unit 60 of the HUD 100.

The following (1) to (4) are examples of display items that can be displayed by the HUD 100, but the display items are not limited thereto.

(1) Information indicating an operation state of the automobile 10, such as speed information, engine revolutions per minute (RPM) information, engine cooling water temperature information, remaining fuel information, real-time fuel efficiency information, direction indicator blink information, or headlight lighting direction information of the automobile 10; (2) Information indicating that the automobile 10 needs maintenance, such as information indicating that a brake pad is worn, information indicating that the level of engine oil has decreased, or information indicating that the temperature of engine cooling water is high; (3) Route guidance information generated by the navigation device 74; and (4) Information indicating danger involved in driving, such as information indicating the presence and position of an obstacle, such as another vehicle or another person, or information indicating that the automobile 10 is approaching an obstacle.

Figure 3:
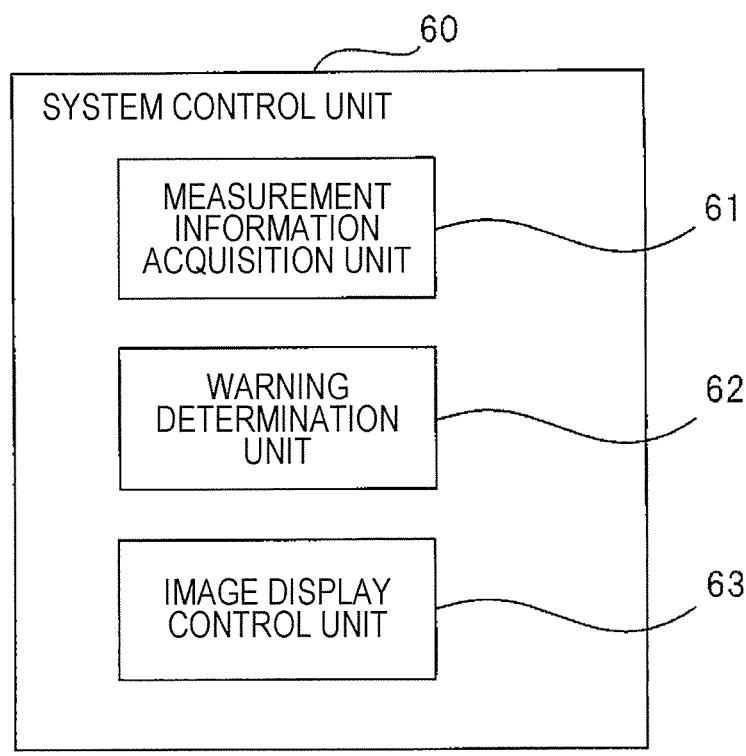
FIG. 3 is a functional block diagram of a system control unit 60 illustrated in FIG. 2.

FIG. 3 is a functional block diagram of the system control unit 60 illustrated in FIG. 2.

The system control unit 60 includes a measurement information acquisition unit 61, a warning determination unit 62, and an image display control unit 63. The measurement information acquisition unit 61, the warning determination unit 62, and the image display control unit 63 are configured by executing a program stored in the ROM by the processor of the system control unit 60. The program includes a display control program.

The measurement information acquisition unit 61 acquires pieces of information measured by one or more of the information measuring devices mounted in the automobile 10 and by the motion sensor 50 serving as an information measuring device mounted in the HUD 100.

The warning determination unit 62 determines, in accordance with any of the pieces of information acquired by the measurement information acquisition unit 61, whether or not a warning to the driver is necessary. Here, a warning means giving a notification indicating that a certain action needs to be taken to avoid danger.

Hereinafter, examples of a case where the warning determination unit 62 determines that a warning is necessary will be given, but the case is not limited thereto.

(A) When the running speed information acquired from the speedometer is greater than or equal to a speed threshold value that is set in advance, the warning determination unit 62 determines that a notification prompting speed reduction is necessary.

(B) When the engine RPM acquired from the gauge is greater than or equal to an RPM threshold value that is set in advance, the warning determination unit 62 determines that a notification prompting a decrease in the force of stepping on the accelerator is necessary.

(C) When the acceleration information acquired from the motion sensor 50 is greater than or equal to an acceleration threshold value that is set in advance, the warning determination unit 62 determines that a notification prompting speed reduction is necessary.

(D) When the acceleration information acquired from the motion sensor 50 suddenly changes to the threshold value or smaller, the warning determination unit 62 determines that there is a risk of collision with an obstacle, and determines that a notification prompting the driver to take a defensive posture (for example, a posture in which the driver's head is in the driver's hands, with the head kept down) is necessary.

(E) When the amount of motion of the automobile 10 in the right-hand and left-hand directions based on the angular rate information acquired from the motion sensor 50 is greater than or equal to a motion threshold value over a predetermined period, the warning determination unit 62 determines that the driver is feeling sleepy and is driving in a zig zag manner, and determines that a notification prompting awakening is necessary to stop the zig-zag driving.

(F) The warning determination unit 62 performs predetermined image processing on a captured image signal acquired from the imaging device 9 to measure the number of blinks of a person seated on the driver's seat. When the value of the number of blinks in a predetermined period is greater than or equal to a number-of-times threshold value, the warning determination unit 62 determines that the driver is feeling sleepy and determines that a notification prompting awakening is necessary.

(G) The warning determination unit 62 calculates the distance between the automobile 10 and an obstacle in accordance with the measurement information acquired from the radar 77. When the distance is smaller than or equal to a distance threshold value that is set in advance, the warning determination unit 62 determines that there is a risk of collision with the obstacle, and determines that a notification prompting the driver to take a defensive posture is necessary.

The ROM of the system control unit 60 stores the content (for example, the notifications described in the foregoing (A) to (G)) of warnings (notifications indicating that a certain action is necessary) that are determined to be necessary by the warning determination unit 62, in association with warning information.

As a result of determination by the warning determination unit 62, when it is determined that a warning is not necessary, the image display control unit 63 performs first display control for generating, in accordance with display target information received from the control unit 70, first image data for displaying the display target information in a predetermined layout, and for inputting the first image data to the driving unit 45.

The first image data is, for example, image data for displaying at least one of the pieces of information included in the foregoing display items (1) to (4).

As a result of determination by the warning determination unit 62, when it is determined that a warning is necessary, the image display control unit 63 performs second display control for retrieving, from the ROM, warning information corresponding to the content of the warning that has been determined to be necessary, for generating second image data for displaying the warning information in a predetermined layout, and for inputting the second image data to the driving unit 45.

The second image data is image data corresponding to the content of the warning that has been determined to be necessary by the warning determination unit 62. The content of the warning is decided in accordance with the information acquired by the measurement information acquisition unit 61, as described in the foregoing (A) to (G) as examples. Thus, the second image data is image data that is based on the information acquired by the measurement information acquisition unit 61.

Figure 4:
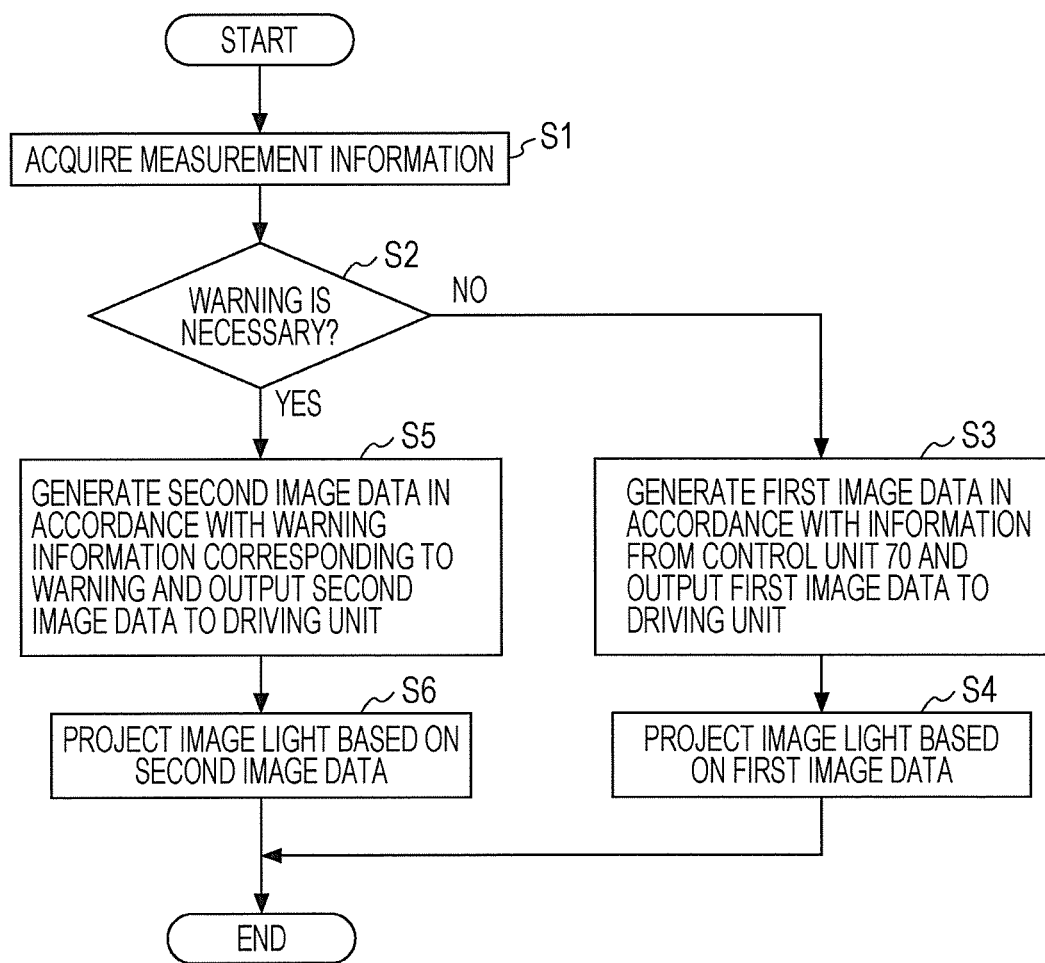
FIG. 4 is a flowchart for describing an operation of the HUD 100 illustrated in FIG. 1.

FIG. 4 is a flowchart for describing an operation of the HUD 100 illustrated in FIG. 1. The process illustrated in FIG. 4 is repeatedly performed while the power of the HUD 100 is in an ON state.

Upon the power of the HUD 100 being turned on, the control unit 70 of the automobile 10 repeatedly performs a process of determining the content to be displayed on the HUD 100 in accordance with various pieces of information measured by the information measuring devices mounted in the automobile 10, information received from the navigation device 74, and the like, and inputting display target information to the system control unit 60 of the HUD 100.

On the other hand, upon the power being turned on, the measurement information acquisition unit 61 of the HUD 100 acquires measurement information measured by one or more of the information measuring devices of the automobile 10 and by the motion sensor 50 (step S1). Subsequently, the warning determination unit 62 determines, in accordance with the measurement information acquired by the measurement information acquisition unit 61, whether or not a warning is necessary (step S2).

When it is determined that a warning is not necessary (NO in step S2), the image display control unit 63 generates first image data in accordance with the display target information that has been received from the control unit 70, and inputs the first image data to the driving unit 45 (step S3).

Figure 5:
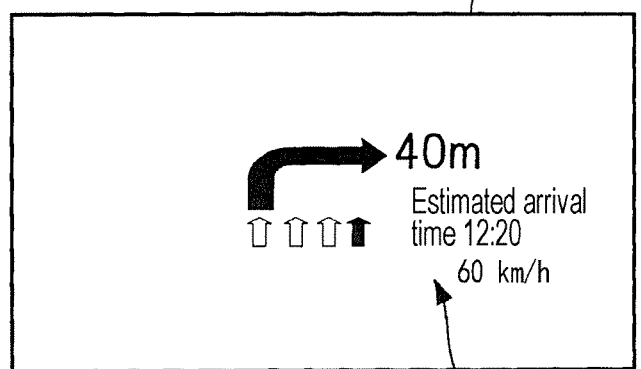
FIG. 5 is a diagram illustrating an example of an image displayed by the HUD 100.

The driving unit 45 drives the light modulation element 44 in accordance with the first image data received from the image display control unit 63, thereby projecting image light that is based on the first image data onto the projection surface 2 (step S4). Accordingly, as illustrated in FIG. 5 as an example, an image 81 including route guidance information, an estimated time of arrival at the destination, and running speed information is projected onto the projection surface 2 and is observed by the driver.

On the other hand, when it is determined that a warning is necessary (YES in step S2), the image display control unit 63 retrieves, from the ROM, warning information corresponding to the content of the warning determined to be necessary, generates second image data for displaying the retrieved warning information, and inputs the second image data to the driving unit 45 (step S5). Step S3 and step S5 constitute an image display control step.

The driving unit 45 drives the light modulation element 44 in accordance with the second image data received from the image display control unit 63, thereby projecting image light that is based on the second image data onto the projection surface 2 (step S6).

Figure 6:
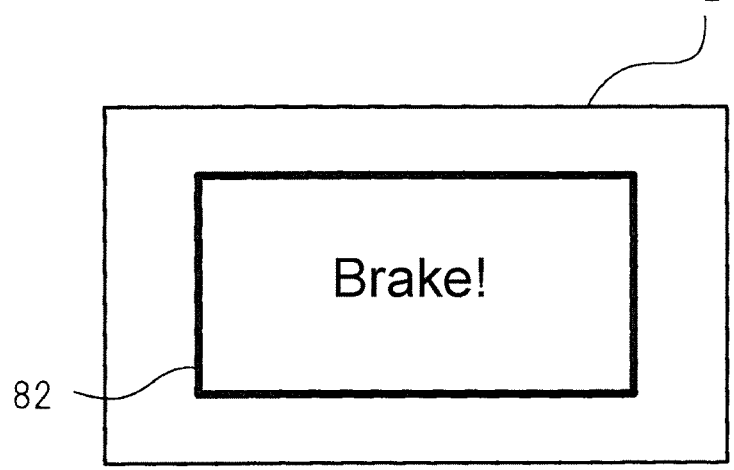
FIG. 6 is a diagram illustrating another example of an image displayed by the HUD 100.

For example, when the content of the warning is the content shown in the foregoing (A) or (C), an image 82 prompting speed reduction by pressing of the brake is projected onto the projection surface 2, as illustrated in FIG. 6, and is observed by the driver.

Figure 7:
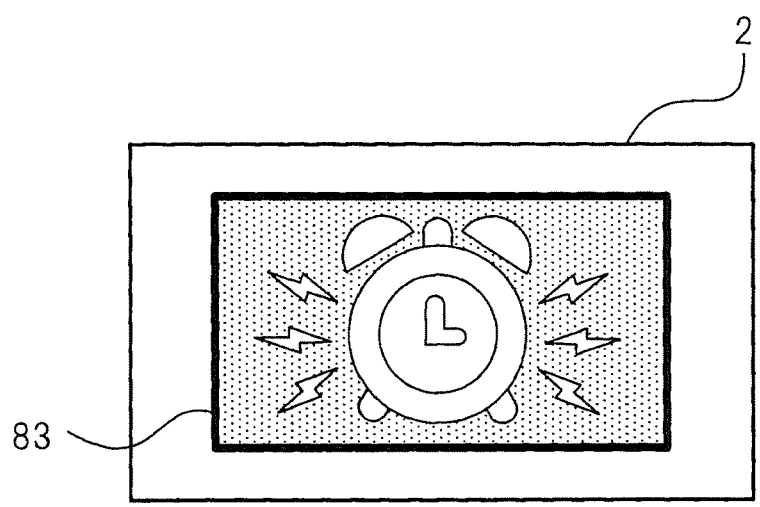
FIG. 7 is a diagram illustrating still another example of an image displayed by the HUD 100.

Alternatively, when the content of the warning is the content shown in the foregoing (F), an image 83 of an alarm clock prompting awakening is projected onto the projection surface 2, as illustrated in FIG. 7, and is observed by the driver. The image 83 may be displayed at a luminance higher than the luminance of an image projected onto the projection surface 2 in accordance with the first image data, or may be displayed while being blinked.

As described above, according to the HUD 100, it is possible to determine whether or not a warning is necessary, in accordance with pieces of information measured by one or more of the information measuring devices mounted in the automobile 10 and by the motion sensor 50 serving as an information measuring device mounted in the HUD 100, without using information received from the control unit 70 of the automobile 10. Thus, even in a situation where the processing load on the control unit 70 of the automobile 10 is high, the image illustrated in FIG. 6 or 7 for giving a warning can be displayed without delay, and safe driving can be assisted.

For example, when the automobile 10 is in the first mode, the processing load on the control unit 70 of the automobile 10 may increase. Even in such a case, with the HUD 100, the system control unit 60 is able to instantaneously determine an emergency and to present an appropriate warning with a minimized display delay.

In addition, the HUD 100 includes the motion sensor 50, which is an information measuring device. Thus, the system control unit 60 of the HUD 100 is able to acquire information from the motion sensor 50 more quickly than from another information measuring device. Thus, the system control unit 60 is able to quickly determine whether or not a warning of the content shown in the foregoing (C), (D), or (E) is necessary, further shorten a display delay time, and assist more safe driving.

In the description given above, measurement information is also input to the system control unit 60 from one or more of the information measuring devices mounted in the automobile 10, but this is not essential.

The system control unit 60 of the HUD 100 may acquire only the measurement information measured by the motion sensor 50 and determine, in accordance with the measurement information, whether or not a warning is necessary. Also with this configuration, it is possible to independently determine whether or not a warning of the content shown in the foregoing (C), (D), or (E) is necessary and quickly give the warning.

In the configuration in FIG. 2, the motion sensor 50 of the HUD 100 may be omitted, and the measurement information measured by the motion sensor 76 of the automobile 10 may be input to the system control unit 60. With this configuration, the configuration of the HUD 100 can be simplified and the manufacturing cost can be reduced.

In addition, in the configuration in FIG. 2, the motion sensor 50 of the HUD 100 may be omitted, and the measurement information measured by at least one of the information measuring devices mounted in the automobile 10 may be input to the system control unit 60. With this configuration, the configuration of the HUD 100 can be simplified and the manufacturing cost can be reduced.

Preferably, the image display control unit 63 of the HUD 100 is configured to selectively perform the first display control or the second display control only when the first mode is set, and to perform only the first display control (display of an image according to an instruction from the control unit 70 of the automobile 10) when the second mode is set.

With this configuration, in the second mode in which the processing load on the control unit 70 of the automobile 10 is low, the processing load on the system control unit 60 of the HUD 100 can be reduced. Thus, an increase in temperature inside the HUD 100 can be prevented.

As described above, this specification discloses the followings.

(1) A projection display device including: a light modulation unit that spatially modulates, in accordance with image data that has been input, light emitted by a light source; a projection optical system that projects the light that has been spatially modulated onto a projection surface of a vehicle; a measurement information acquisition unit that acquires measurement information measured by an information measuring device; an image display control unit that performs either first display control for generating image data in accordance with information received from a control unit that controls the vehicle and for inputting the image data to the light modulation unit or second display control for generating image data in accordance with the measurement information and for inputting the image data to the light modulation unit; and a warning determination unit that determines, in accordance with the measurement information, whether or not a warning is necessary, wherein the image display control unit performs the second display control when the warning determination unit determines that the warning is necessary, and performs the first display control when the warning determination unit determines that the warning is not necessary.

(2) The projection display device described in (1), further including the information measuring device.

(3) The projection display device described in (1), wherein the information measuring device is at least one selected from among an acceleration sensor, an angular rate sensor, a speedometer, an imaging device, a laser radar, an ultrasonic radar, and a millimeter-wave radar.

(4) The projection display device described in (2), wherein the information measuring device is at least one of an acceleration sensor or an angular rate sensor.

(5) The projection display device described in any one of (1) to (4), wherein the vehicle is settable to a first mode in which driving is performed in accordance with an internally generated instruction or an externally and wirelessly received instruction and a second mode in which a person drives manually, and the image display control unit selectively performs the first display control or the second display control when the first mode is set, and performs only the first display control when the second mode is set.

(6) A display control method for a projection display device having a light modulation unit that spatially modulates, in accordance with image data that has been input, light emitted by a light source, and a projection optical system that projects the light that has been spatially modulated onto a projection surface of a vehicle, the display control method including: a measurement information acquisition step of acquiring measurement information measured by an information measuring device mounted in the vehicle; an image display control step of performing either first display control for generating image data in accordance with information received from a control unit that controls the vehicle and for inputting the image data to the light modulation unit or second display control for generating image data in accordance with the measurement information and for inputting the image data to the light modulation unit; and a warning determination step of determining, in accordance with the measurement information, whether or not a warning is necessary, wherein the image display control step performs the second display control when the warning determination step determines that the warning is necessary, and performs the first display control when the warning determination step determines that the warning is not necessary.

(7) The display control method for the projection display device described in (6), wherein the information measuring device is built in the projection display device.

(8) The display control method for the projection display device described in (6), wherein the information measuring device is at least one selected from among an acceleration sensor, an angular rate sensor, a speedometer, an imaging device, a laser radar, an ultrasonic radar, and a millimeter-wave radar.

(9) The display control method for the projection display device described in (7), wherein the information measuring device is at least one of an acceleration sensor or an angular rate sensor.

(10) The display control method for the projection display device described in any one of (6) to (9), wherein the vehicle is settable to a first mode in which driving is performed in accordance with an internally generated instruction or an externally and wirelessly received instruction and a second mode in which a person drives manually, and the image display control step selectively performs the first display control or the second display control when the first mode is set, and performs only the first display control when the second mode is set.

(11) A display control program for a projection display device having a light modulation unit that spatially modulates, in accordance with image data that has been input, light emitted by a light source, and a projection optical system that projects the light that has been spatially modulated onto a projection surface of a vehicle, the display control program causing a computer to execute: a measurement information acquisition step of acquiring measurement information measured by an information measuring device mounted in the vehicle; an image display control step of performing either first display control for generating image data in accordance with information received from a control unit that controls the vehicle and for inputting the image data to the light modulation unit or second display control for generating image data in accordance with the measurement information and for inputting the image data to the light modulation unit; and a warning determination step of determining, in accordance with the measurement information, whether or not a warning is necessary, wherein the image display control step performs the second display control when the warning determination step determines that the warning is necessary, and performs the first display control when the warning determination step determines that the warning is not necessary.

(12) A projection display device including: a light modulation unit that spatially modulates, in accordance with image data that has been input, light emitted by a light source; a projection optical system that projects the light that has been spatially modulated onto a projection surface of a vehicle; a measurement information acquisition unit that acquires measurement information measured by an information measuring device; an image display control unit that performs either first display control for generating image data in accordance with information received from a control unit that controls the vehicle and for inputting the image data to the light modulation unit or second display control for generating image data in accordance with the measurement information and for inputting the image data to the light modulation unit; and a processor functioning as a warning determination unit that determines, in accordance with the measurement information, whether or not a warning is necessary, wherein the image display control unit performs the second display control when the warning determination unit determines that the warning is necessary, and performs the first display control when the warning determination unit determines that the warning is not necessary.

According to the present invention, safe driving of a vehicle can be assisted while preventing a delay in displaying important information.

The present invention has been described above based on a specific embodiment. The present invention is not limited to this embodiment, and various changes are possible without deviating from the technical spirit of the disclosed invention.

The present application is based on Japanese Patent Application (JP2016-181516) filed on Sep. 16, 2016, the entire content of which is incorporated herein.

REFERENCE SIGNS LIST

100 HUD
1 front windshield
2 projection surface
3 dashboard
4 control unit
5 diffusion member
6 reflection mirror
7 concave mirror
8 rearview mirror
9 imaging device
10 automobile
40 light source unit
40A light source control unit
41r R light source
41g G light source
41b B light source
42r, 42g, 42b collimator lens
43 dichroic prism
44 light modulation element
45 driving unit
50 motion sensor
60 system control unit
61 measurement information acquisition unit
62 warning determination unit
63 image display control unit
70 control unit
71 steering control unit
72 acceleration/deceleration control unit
73 display unit
74 navigation device
75 engine control unit
76 motion sensor
77 radar
81, 82, 83 image

What is claimed is:

1. A projection display device comprising:
a light modulator that spatially modulates, in accordance with image data that has been input, light emitted by a light source;
a projection optical system that projects the light that has been spatially modulated onto a projection surface of a vehicle;
an information measuring device comprising a first processor,
electrically coupled to the information measuring device, the first processor is further configured to:
acquire measurement information measured by the information measuring device;
perform a first display control for generating image data in accordance with information received from a second processor that controls the vehicle and then inputting the image data to the light modulator, and a second display control for generating image data in accordance with the measurement information acquired directly from the information measuring device without passing through the second processor that controls the vehicle and then inputting the image data to the light modulator;
determine, in accordance with the measurement information, whether or not a warning is necessary, wherein
perform the second display control when the first processor determines that the warning is necessary, and perform the first display control when the first processor determines that the warning is not necessary, wherein
in a first mode in which driving of the vehicle is performed in accordance with an internally generated instruction or an instruction externally and wirelessly received, the first processor performs at least the second display control without passing through the second processor.

2. The projection display device according to claim 1, wherein
the information measuring device is at least one selected from among an acceleration sensor, an angular rate sensor, a speedometer, an imaging device, a laser radar, an ultrasonic radar, and a millimeter-wave radar.

3. The projection display device according to claim 1, wherein
the information measuring device is at least one of an acceleration sensor or an angular rate sensor.

4. The projection display device according to claim 1, wherein
the vehicle is settable to the first mode and a second mode in which a person drives the vehicle manually, and
the first processor selectively performs the first display control or the second display control when the first mode is set, and performs only the first display control when the second mode is set.

5. The projection display device according to claim 2, wherein
the vehicle is settable to the first mode and a second mode in which a person drives the vehicle manually, and
the first processor selectively performs the first display control or the second display control when the first mode is set, and performs only the first display control when the second mode is set.

6. The projection display device according to claim 3, wherein
the vehicle is settable to the first mode and a second mode in which a person drives the vehicle manually, and
the first processor selectively performs the first display control or the second display control when the first mode is set, and performs only the first display control when the second mode is set.

7. A display control method for a projection display device comprising a light modulator that spatially modulates, in accordance with image data that has been input, light emitted by a light source, and a projection optical system that projects the light that has been spatially modulated onto a projection surface of a vehicle,
the display control method comprising:
acquiring measurement information measured by first processor of an information measuring device mounted in the vehicle and built into the projection display device;
performing a first display control for generating image data in accordance with information received from a control unit second processor that controls the vehicle and then inputting the image data to the light modulator, and a second display control for generating image data in accordance with the measurement information acquired directly from the information measuring device without passing through the second processor that controls the vehicle and then inputting the image data to the light modulator; and
determining, in accordance with the measurement information, whether or not a warning is necessary, wherein
the second display control is performed when the determining that the warning is necessary, and performing the first display control when determining that the warning is not necessary,
in a first mode in which driving of the vehicle is performed in accordance with an internally generated instruction or an instruction externally and wirelessly received, performing at least the second display control without passing through the second processor.

8. The display control method for the projection display device according to claim 7, wherein
the information measuring device is at least one selected from among an acceleration sensor, an angular rate sensor, a speedometer, an imaging device, a laser radar, an ultrasonic radar, and a millimeter-wave radar.

9. The display control method for the projection display device according to claim 7, wherein
the information measuring device is at least one of an acceleration sensor or an angular rate sensor.

10. The display control method for the projection display device according to claim 7, wherein
the vehicle is settable to the first mode and a second mode in which a person drives manually, and
the first display control or the second display control is selectively performed when the first mode is set, and only the first display control is performed when the second mode is set.

11. The display control method for the projection display device according to claim 8, wherein
the vehicle is settable to the first mode and a second mode in which a person drives manually, and
the first display control or the second display control is selectively performed when the first mode is set, and only the first display control is performed when the second mode is set.

12. The display control method for the projection display device according to claim 9, wherein
the vehicle is settable to the first mode and a second mode in which a person drives manually, and
the first display control or the second display control is selectively performed when the first mode is set, and only the first display control is performed when the second mode is set.

13. A non-transitory computer readable medium storing a display control program for a projection display device having a light modulator that spatially modulates, in accordance with image data that has been input, light emitted by a light source, and a projection optical system that projects the light that has been spatially modulated onto a projection surface of a vehicle,
the display control program causing a computer to execute:
acquiring measurement information measured by a first processor of an information measuring device mounted in the vehicle and built into the projection display device;
performing a first display control for generating image data in accordance with information received from a second processor that controls the vehicle and then inputting the image data to the light modulator, and a second display control for generating image data in accordance with the measurement information acquired directly from the information measuring device without passing through the second processor that controls the vehicle and then inputting the image data to the light modulator; and
determining, in accordance with the measurement information, whether or not a warning is necessary, wherein
the display control program causing the computer to perform the second display control when determining that the warning is necessary, and perform the first display control when determining that the warning is not necessary, in a first mode in which driving of the vehicle is performed in accordance with an internally generated instruction or an instruction externally and wirelessly received, the display control program causing the computer to perform at least the second display control without passing through the second processor.

* * * * *